(12) United States Patent
Gutmann et al.

(10) Patent No.: US 11,543,061 B2
(45) Date of Patent: Jan. 3, 2023

(54) CRIMPED END CONNECTION FOR FLEXIBLE HOSE

(71) Applicant: Swagelok Company, Solon, OH (US)

(72) Inventors: Daniel Gutmann, Aurora, OH (US); Stephen Zaborszki, Northfield Center, OH (US); Corey Pasheilich, Solon, OH (US); Angela Rodriguez, Cleveland, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 17/035,900

(22) Filed: Sep. 29, 2020

(65) Prior Publication Data

US 2021/0095799 A1 Apr. 1, 2021

Related U.S. Application Data

(60) Provisional application No. 62/907,808, filed on Sep. 30, 2019.

(51) Int. Cl.
*F16L 33/20* (2006.01)
*F16L 33/207* (2006.01)

(52) U.S. Cl.
CPC .................. *F16L 33/2076* (2013.01)

(58) Field of Classification Search
CPC ................................... F16L 33/2076
See application file for complete search history.

(56) References Cited

U.S. PATENT DOCUMENTS 4,089,351 A 5/1978 Ward
4,226,446 A * 10/1980 Burrington ......... F16L 33/2076
285/256

(Continued)

FOREIGN PATENT DOCUMENTS

DE 1273931 B * 7/1968 .......... F16L 33/2076
DE 102007026394 12/2008

(Continued)

OTHER PUBLICATIONS

International Search Report and Written Opinion dated Mar. 11, 2021.

(Continued)

*Primary Examiner* — Zachary T Dragicevich
*Assistant Examiner* — James A Linford
(74) *Attorney, Agent, or Firm* — Calfee, Halter & Griswold LLP

(57) ABSTRACT

A hose assembly includes a hose, a connector body, and a collar. The connector body has an outer end portion defining a fluid connector, an inner end defining a nose portion received in an inner bore of the hose end portion, and an intermediate portion including first and second annular flanges spaced apart to define a dog lock groove. The collar includes an outer end portion defining an inner radial dog lock received in the dog lock groove, an annular step portion extending radially outward of and axially inward of the dog lock in axial alignment with the first annular flange, and an inner end portion extending radially outward of and axially inward from the step portion, the inner end portion being in radial compression against an outer surface of the hose end portion.

20 Claims, 4 Drawing Sheets

(56) References Cited

U.S. PATENT DOCUMENTS

| | | | |
|---|---|---|---|
| 4,227,639 | A | 10/1980 | Blumenberg |
| 4,684,157 | A | 8/1987 | Smith |
| 5,263,747 | A | 11/1993 | Lefebvre |
| 5,267,758 | A * | 12/1993 | Shah .................. F16L 33/2076 285/256 |
| 5,511,720 | A | 4/1996 | Zaborszki |
| 5,638,869 | A | 6/1997 | Zaborszki |
| 5,803,511 | A | 9/1998 | Bessette |
| 6,561,690 | B2 | 2/2003 | Chen |
| 8,727,338 | B2 | 5/2014 | DiPalma |
| 2002/0073523 | A1* | 6/2002 | Feher ..................... B25B 27/10 29/243.5 |
| 2004/0112454 | A1 | 6/2004 | Takagi |
| 2007/0079885 | A1 | 4/2007 | Zaborszki |
| 2007/0096461 | A1* | 5/2007 | Owens ................. F16L 33/207 285/256 |
| 2009/0295154 | A1* | 12/2009 | Weil ................... F16L 33/2076 285/337 |
| 2011/0006515 | A1* | 1/2011 | Yanik ................... A61M 39/18 285/239 |
| 2012/0007359 | A1 | 1/2012 | Brill |
| 2012/0161437 | A1* | 6/2012 | Smith ..................... F16L 25/01 285/313 |
| 2020/0278055 | A1 | 9/2020 | Zaborszki |

FOREIGN PATENT DOCUMENTS

| | | | |
|---|---|---|---|
| DE | 102014114470 | | 4/2014 |
| EP | 719970 | | 2/1983 |
| EP | 161864 | | 11/1985 |
| EP | 255393 | | 2/1988 |
| EP | 939266 | | 9/1999 |
| EP | 1707860 | | 3/2009 |
| EP | 2469143 | | 6/2012 |
| EP | 2327914 | | 8/2013 |
| EP | 2886923 | A1 * 6/2015 | ........ F16L 33/2076 |
| FR | 923507 | A * 7/1947 | ........ F16L 33/2076 |
| GB | 2046388 | | 11/1980 |

OTHER PUBLICATIONS

International Search Report and Written Opinion from PCT/US20/20258 dated Jun. 4, 2020.
Partial International Search Report dated Jan. 14, 2021.

* cited by examiner

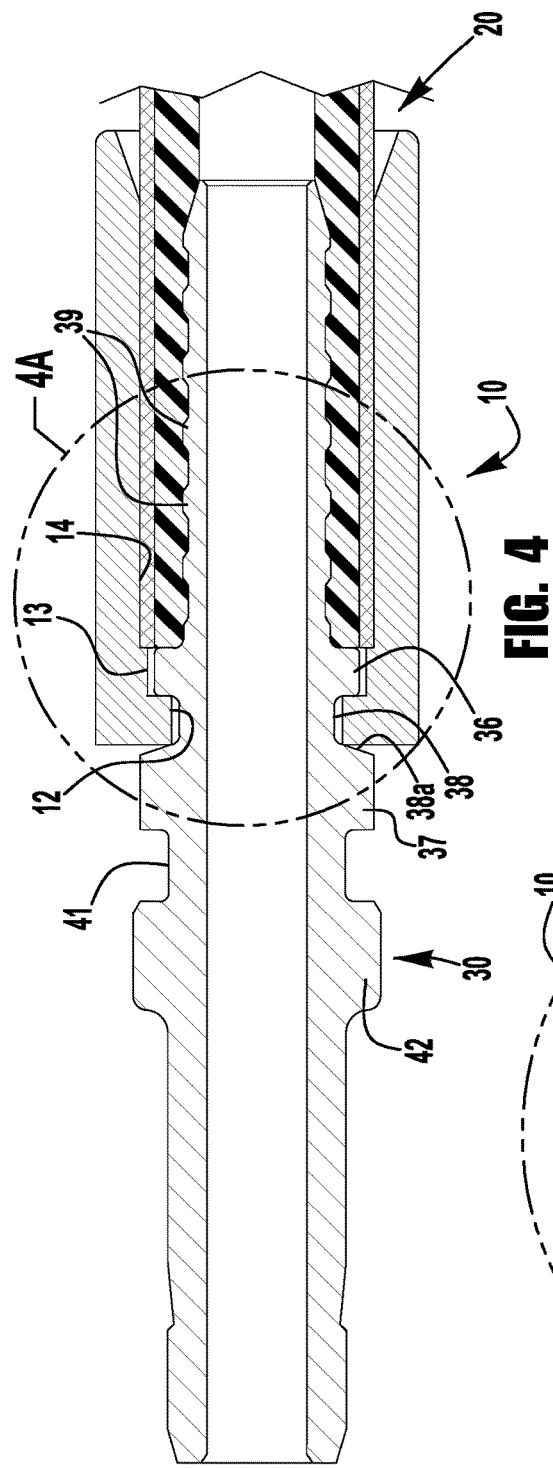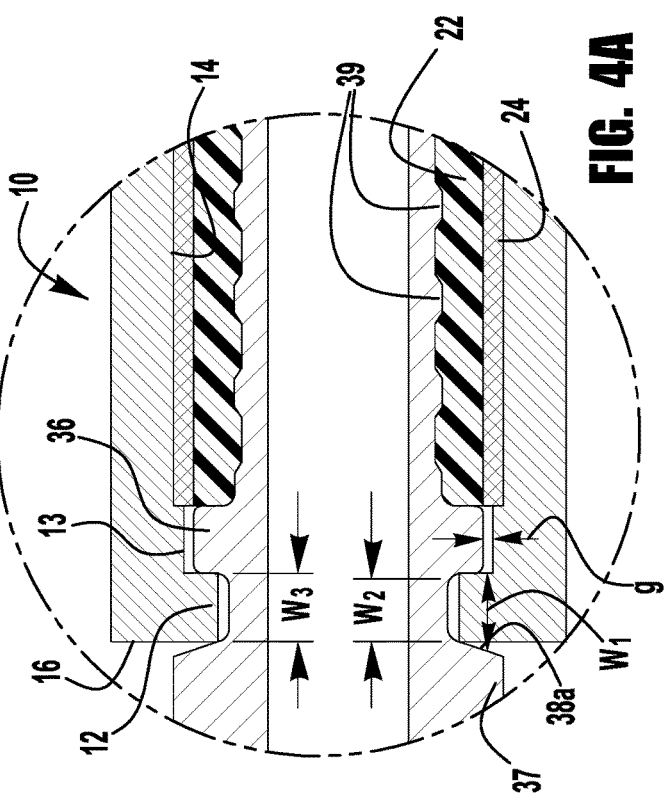

CRIMPED END CONNECTION FOR FLEXIBLE HOSE

CROSS-REFERENCE TO RELATED APPLICATION

This application claims priority to and all benefit of U.S. Provisional Patent Application Ser. No. 62/907,808, filed on Sep. 30, 2019, entitled CRIMPED END CONNECTION FOR FLEXIBLE HOSE, the entire disclosure of which is incorporated herein by reference.

TECHNICAL FIELD

The present disclosure relates to flexible hose assemblies and to methods of making flexible hose assemblies. More particularly, the disclosure relates to flexible plastic hoses having a crimped end connection.

SUMMARY OF THE DISCLOSURE

In accordance with an embodiment of one or more of the inventions presented in this disclosure, a hose assembly includes a hose, a connector body, and a collar. The connector body has an outer end portion defining a fluid connector, an inner end defining a nose portion received in an inner bore of the hose end portion, and an intermediate portion including first and second annular flanges spaced apart to define a dog lock groove. The collar includes an outer end portion defining an inner radial dog lock received in the dog lock groove, an annular step portion extending radially outward of and axially inward of the dog lock in axial alignment with the first annular flange, and an inner end portion extending radially outward of and axially inward from the step portion, with the inner end portion being in radial compression against an outer surface of the hose end portion. The outer surface of the hose end portion has an outer diameter that is larger than an inner diameter of the step portion, such that the outer surface of the hose end portion is secured axially inward of the first annular flange.

In accordance with another embodiment of one or more of the inventions presented in this disclosure, a hose assembly includes a hose, a connector body, and a collar. The connector body has an outer end portion defining a fluid connector, an inner end defining a nose portion received in the inner bore of the hose end portion, and an intermediate portion including first and second annular flanges spaced apart to define a dog lock groove. The collar includes an outer end portion defining an inner radial dog lock received in the dog lock groove and an inner end portion extending radially outward of and axially inward of the dog lock, with the inner end portion being in radial compression against the outer surface of the hose end portion. At least one of the first and second annular flanges defined a tapered side surface of the dog lock groove, with the dog lock contacting the tapered side surface of the dog lock groove to provide an electrically conductive connection between the collar end the connector body.

In accordance with another embodiment of one or more of the inventions presented in this disclosure, a method of making a hose assembly is contemplated. In the exemplary method, a collar is provided, including an outer end portion defining an inner radial dog lock, an annular step portion extending radially outward of and axially inward of the dog lock, and an inner end portion extending radially outward of and axially inward from the step portion. A hose end is inserted into the inner end portion of the collar such that an axially outer edge of an outer surface of the hose end abuts an axially inner end of the annular step portion. A nose portion of a connector body is inserted through the outer end portion of the collar and into an inner bore in the hose end portion, such that the dog lock is axially aligned with an annular dog lock groove in an intermediate portion of the connector body. The collar is crimped radially inward, such that the dog lock is received in the dog lock groove, and the hose end portion is radially compressed between the inner end portion of the collar and the nose portion of the connector body.

BRIEF DESCRIPTION OF THE DRAWINGS

FIG. 4 is a cross-sectional view of the collar, hose end, and connector body of FIG. 3, with the collar crimped into interlocking engagement with the connector body for sealing engagement between the connector body and the hose end; and FIG. 4A is an enlarged partial cross-sectional view of a circled portion of the hose assembly of FIG. 4.

DESCRIPTION OF THE EXEMPLARY EMBODIMENTS

Figure 1:
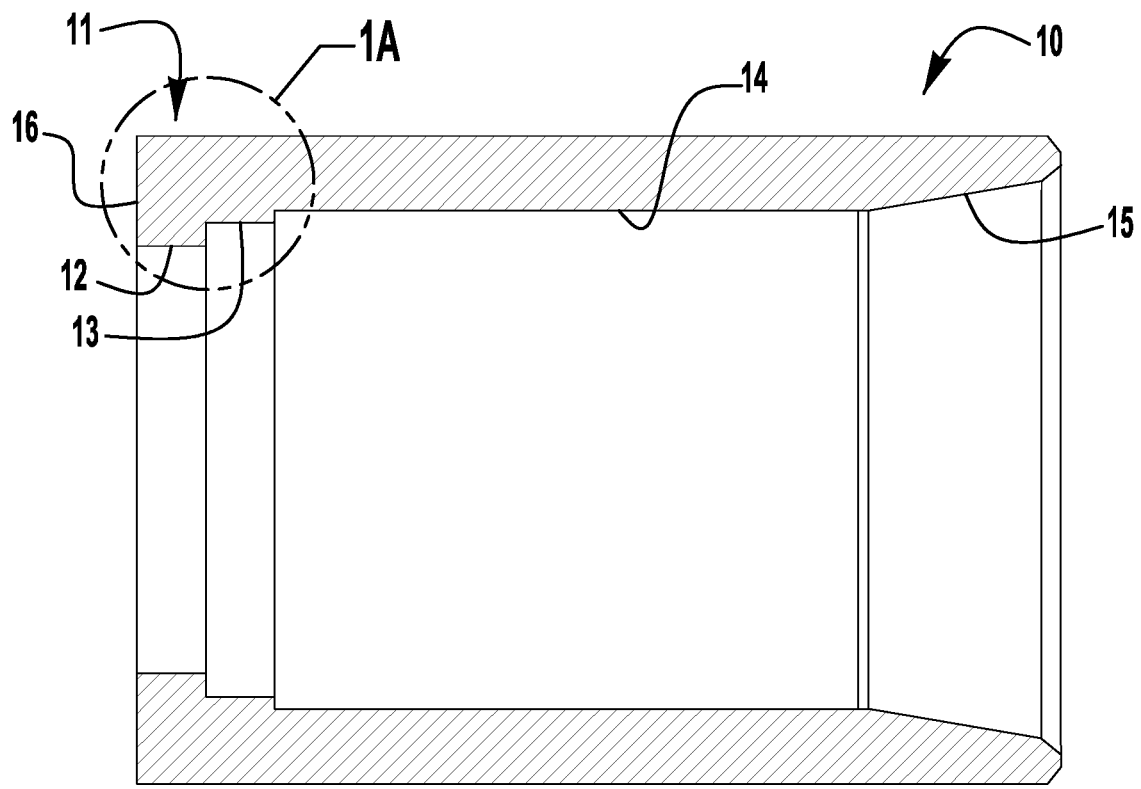
FIG. 1 is a cross-sectional view of a connector body securing collar for a hose assembly, in accordance with an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). A flexible plastic hose configured to provide, for example, desired system temperature ratings, system pressure ratings, and chemical compatibility, commonly includes an inner or core plastic (e.g., PTFE, PFA) tube and an outer sheath, cover or other such reinforcement layer (e.g., a metal braided sheath) providing protection for the core tube while permitting bending movement.

To facilitate installation into a fluid system, hose assemblies are commonly provided with any of a variety of end connections, including, for example, tube fittings, tube ends (e.g., for welding or installation in a tube fitting), or quick disconnect couplings, and therefore require a leak-tight connection between the inner and outer flexible hose tube components and the end connection. For plastic hose assemblies, such end connections may be crimped to the hose ends. In some such applications, alignment of the hose end within the connector to be crimped may present challenges, with proper alignment of the hose end within the end connection being difficult to determine or ensure.

According to an exemplary aspect of the present disclosure, a connector body may be secured to a hose end by a crimped collar including an internal hose end locating feature configured to provide a tactile and/or visual indication of proper hose end insertion depth in the collar during installation of the hose end connection on the hose end. In one such embodiment, the hose end locating feature may be configured to position the hose end axially (i.e., along a central axis of the hose assembly components) inward of an interlocking annular flange of the connector body, for example, to prevent the capture of the hose sheath between the annular flange and a crimped interior surface of the collar. The connector body and collar may be provided in a variety of suitable materials, including, for example, metals (e.g., stainless steel).

The hose end locating feature may be provided as an inward radial projection in the internal bore of the collar, positioned to radially align with or interfere with an outer surface of the hose end to provide a positive stop for the inserted hose end. While a variety of different inward radial projections may be utilized, in one exemplary embodiment, the hose end locating feature is provided as an annular step portion extending radially outward of and axially inward of an outer axial dog lock portion of the collar.

Figure 1A:
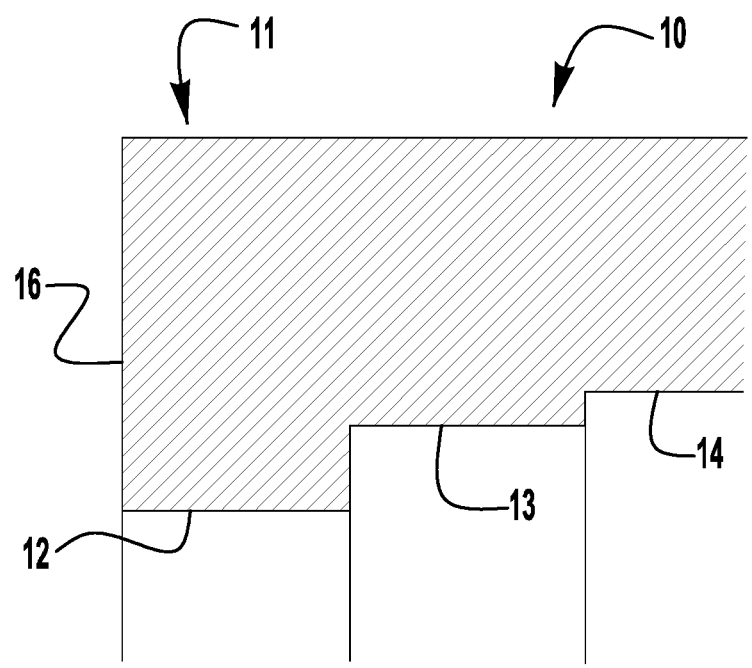
FIG. 1A is a partial cross-sectional view of a circled portion of the collar of FIG. 1.
Figure 1B:
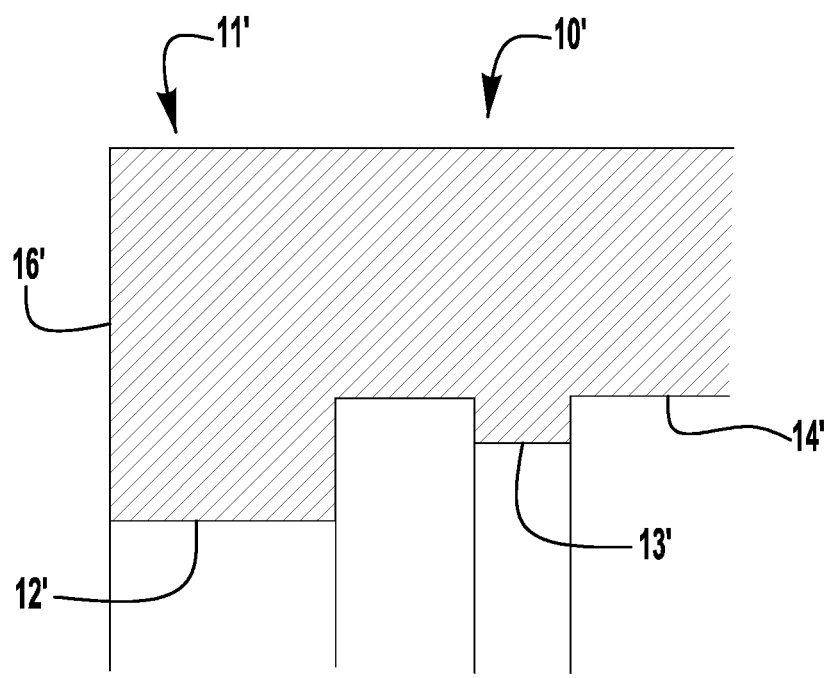
FIG. 1B is a partial cross-sectional view of another collar for a hose assembly, in accordance with another exemplary embodiment of the present disclosure.

FIGS. 1 and 1A illustrates an exemplary collar 10 for a hose end connection, including an outer end portion 11 defining an inner radial dog lock 12, an annular step portion 13 extending radially outward of and axially inward of the dog lock 12, and an inner end portion 14 extending radially outward of and axially inward from the step portion 13. In the illustrated embodiment, the annular step portion 13 extends directly from the dog lock 12. In other embodiments, as shown in FIG. 1B, the step portion 13' may be axially spaced apart from the dog lock 12', forming a separate rib of material. In still other embodiments (not shown), the step portion may not be circumferentially continuous, instead forming discrete protrusions around the inner periphery of the collar, sufficient to provide positive stop abutment for the hose end portion.

Figure 2:
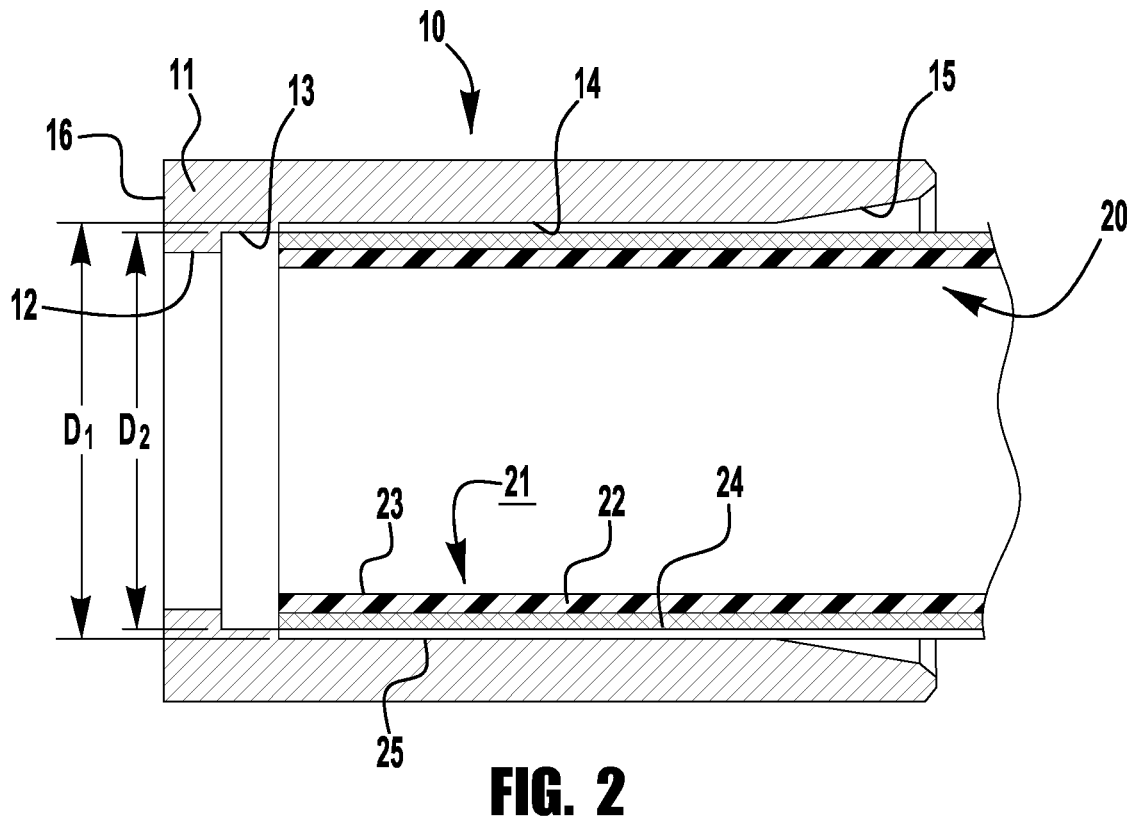
FIG. 2 is a cross-sectional view of the collar of FIG. 1 loosely assembled with a hose end.

The collar 10 may be used with a hose having a hose end with an outer surface an outer diameter that is larger than an inner diameter of the step portion, such that the outer surface of the hose end portion is secured axially inward of the first annular flange. Many different types of hose may be utilized. As one example, a plastic (e.g., PTFE, PFA) hose may be provided with a flexible plastic core tube defining an internal bore or fluid passage, and an outer sheath (e.g., braided metal sheath), for example, to improve hose pressure containment and/or to protect the core tube from abrasion. FIG. 2 illustrates the collar 10 of FIG. 1 loosely assembled with (e.g., slip fit onto) an exemplary hose 20 including a hose end 21 having a plastic core tube 22 defining an internal bore 23, and an outer sheath 24 (e.g., braided metal sheath) covering the plastic core tube 22 to define an outer surface 25 of the hose 20. As shown, an outer diameter D1 of the hose end outer surface 25 is larger than an inner diameter D2 of the step portion 13, such that the step portion provides positive stop abutment for the inserted hose end 21. As shown, the inner end portion 14 may include a chamfered inner end 15, for example, to facilitate alignment and receipt of the hose end portion 21 into the inner end portion 14 of the collar 10. In an exemplary embodiment, a collar 10 for a ½ inch hose has an inner end portion 14 diameter of about 0.65 inches, and a step portion 13 diameter D2 of about 0.63 inches.

To provide an end connection for the hose end 21, a nose portion of a connector body may be inserted through the outer end portion of the collar 11 and into the internal bore 23 of the core tube 22, with the collar 10 being crimped against the connector and the hose end 21 to provide a leak tight gripping engagement between the core tube 22 and the connector body nose portion, and to provide interlocking retention of the connector body with the collar 10.

Figure 3:
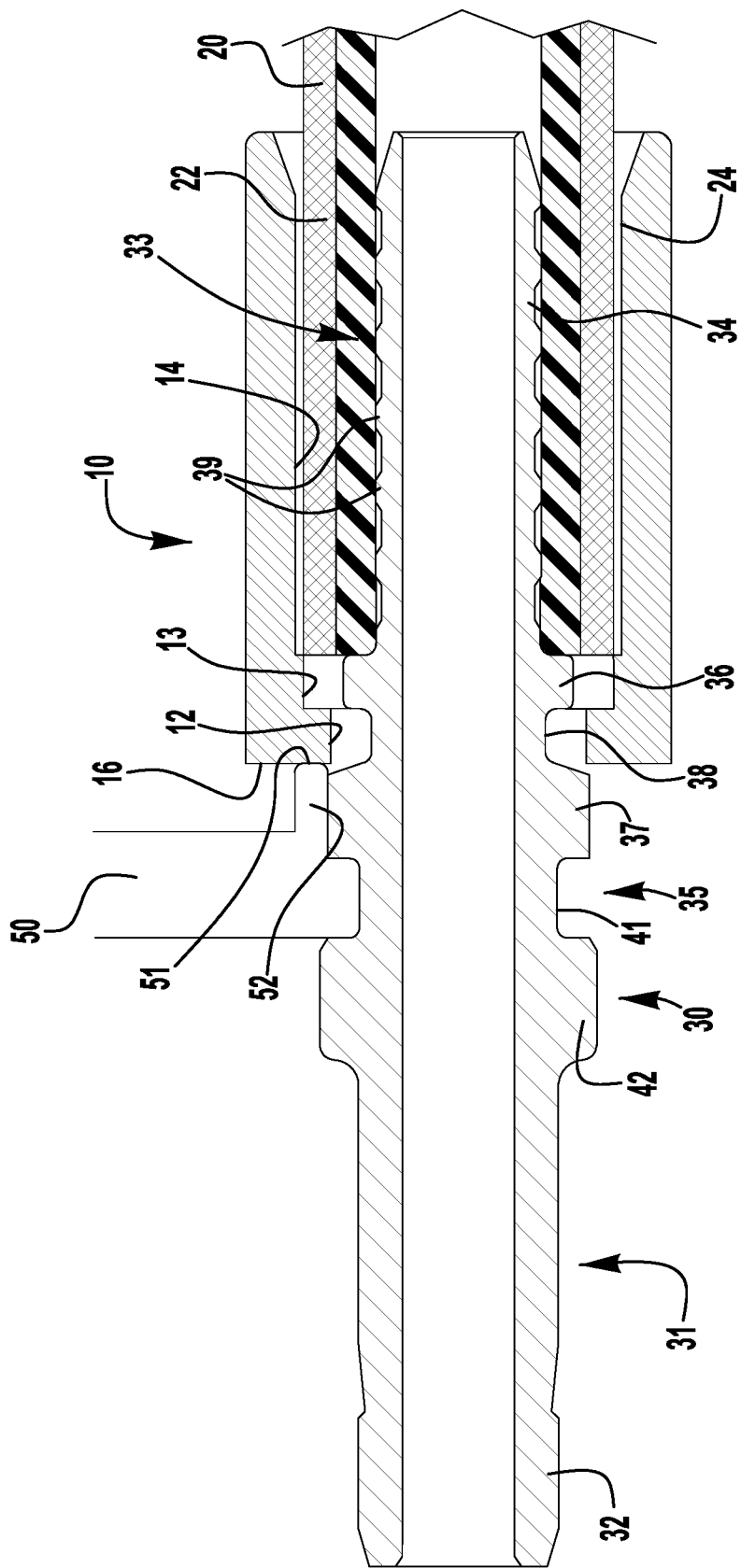
FIG. 3 is a cross-sectional view of the collar and hose end of FIG. 2, with a connector body inserted into the collar and hose end.

Many different collar-connector body interlocking arrangements may be utilized. In one embodiment, a connector body includes a dog lock groove disposed between first and second annular flanges on an intermediate portion of the connector body, with the dog lock portion of the collar being crimped into the dog lock groove for interlocking retention of the connector body with the collar. FIG. 3 illustrates the collar 10 and hose 20 of FIG. 2 assembled with an exemplary connector body 30, prior to crimped attachment, including an outer end portion 31 defining a fluid connector 32 (e.g., tube end, tube fitting, quick connect coupling), an inner end 33 defining a nose portion 34 received in the inner bore 23 of the hose end portion 21, and an intermediate portion 35 including first and second annular flanges 36, 37 spaced apart to define a dog lock groove 38. As shown, the nose portion 34 may include teeth or barbs 39 configured to provide an interference fit between the core tube 22 and the nose portion even before crimping attachment of the hose end connection.

When the connector body 30 is properly assembled with the collar 10 and hose end 21, the dog lock 12 of the collar 10 is axially aligned with the dog lock groove 38, and the first annular flange 36 of the end connection 30 is axially aligned with the annular step portion 13. Many different techniques may be utilized to achieve axial alignment of the dog lock 12 with the dog lock groove 38, including, for example, visual inspection, automated inspection/positioning, and/or the use of a gauge tool to axially position the collar 10 with respect to the connector body 30 (e.g., by abutment of a surface of the gauge tool with a surface of one of the collar and the connector body). In the illustrated embodiment, the connector body 30 may be provided with a tool engaging groove 41, which may be defined by an axial gap between the second annular flange 37 and a third annular flange 42 axially outward of the second annular flange. A gauge tool 50 may be received in or engaged with the tool engaging groove 41, with a gauge surface 51 (e.g., end of axial projection 52 extending axially inward from the tool engaging groove) of the tool 50 being positioned to abut an end face 16 of the outer end portion 11 of the collar 10 when the dog lock 12 is in proper axial alignment with the dog lock groove 38.

The tool engaging groove 41 may be adapted or adopted for additional uses. For example, the tool engaging groove 41 may provide a location for fixturing (e.g., for welding operations) or for attachment of a protective end cap or other accessory. Additionally or alternatively, the tool engaging groove may provide a location for leak testing. In such an arrangement one or more of the first annular flange 36, the second annular flange 37, and the dog lock 12 may be provided with a hole, notch, or other discontinuity configured to provide a passage for fluid that has leaked past the seal between the core tube 22 and the connector body nose portion 34. As used herein, "annular" may include both features that are circumferentially continuous and features that have one or more discontinuities (e.g., an annular flange having one or more holes or notches).

When the connector body 30 is properly assembled with the collar 10 and hose end 21, the collar 10 is crimped radially inward (e.g., using a conventional crimp machine), such that the dog lock 12 is received in the dog lock groove 38, and the inner end portion 14 of the collar 10 is radially compressed against the outer surface 25 of the hose end portion 21 to radially (and sealingly) compress the core tube 22 against the nose portion 34 of the connector body 30, as shown in FIG. 4. As shown, the barbs 39 on the nose portion 34 may provide increased gripping and sealing engagement between the core tube 22 and the nose portion. A portion of the crimped core tube 22 may be extruded between the first annular flange 36 and the annular step portion 13 without affecting the gripping and sealing retention of the hose 20 with the end connection. The relative axial widths and radial heights of the first annular flange 36 and annular step portion 13 may be selected to limit or control this extrusion. In one exemplary embodiment, the annular step has an axial width that is slightly greater than an axial width of the first annular flange, and the radial heights of the first annular flange 36 and step portion 13 are selected to provide a small radial gap g (e.g., about 0.007 inches to about 0.013 inches, or about 0.01 inches) upon crimping.

According to another aspect of the present disclosure, a dog lock groove of a crimped collar hose connection may be provided with at least one tapered side surface extending from a larger outer width of the groove to a smaller inner width of the groove, with the dog lock having an axial width greater than the inner width but smaller than the outer width. In the illustrated embodiment, as best shown in FIG. 4A, the second annular flange 37 defines a tapered side surface 38a of the dog lock groove 38, extending from a larger outer width w1 of the groove to a smaller inner width w2 of the groove, with the dog lock 12 having an axial width w3 greater than the inner width w2 but smaller than the outer width w1. The tapered surface 38a may include a constant angle taper (i.e., frustoconical), for example, a 12°-18° taper, or an approximately 15° taper, or may include a rounded or other such contoured tapered surface. In other embodiments, the first annular flange may additionally or alternatively define a tapered side surface of the dog lock groove.

With the dog lock 12 having an axial width w3 greater than the inner width w2 but smaller than the outer width w1, the aligned, crimped dog lock is ensured of both (a) being sufficiently interlockingly received in the dog lock groove 38 and (b) being in contact with the side surfaces 38a, 38b of the dog lock groove. This contact may, for example, provide for an assurance of an electrically conductive connection between the collar end the connector body (provided in stainless steel or other conductive materials) in applications where this may be desirable. Additionally or alternatively, the contact may provide for more rigid mechanical affixation of the connector body 30 with the collar 10.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A hose assembly comprising:

a hose including an end portion defining an inner bore and an outer surface;

a connector body having an outer end portion defining a fluid connector, an inner end defining a nose portion received in the inner bore of the hose end portion, and an intermediate portion including first and second annular flanges spaced apart to define a dog lock groove; and a collar including an outer end portion defining an inner radial dog lock received in the dog lock groove, an annular step portion extending radially outward of and axially inward of the dog lock in axial alignment with the first annular flange, and an inner end portion extending radially outward of and axially inward from the step portion, the inner end portion being in radial compression against the outer surface of the hose end portion;

wherein the outer surface of the hose end portion has an outer diameter that is larger than an inner diameter of the step portion, such that the outer surface of the hose end portion is secured axially inward of the first annular flange;

wherein at least one of the first and second annular flanges defines a tapered side surface of the dog lock groove, with the dog lock contacting the tapered side surface of the dog lock groove; and wherein the dog lock has an axial width greater than an axial inner width of the dog lock groove, such that an inner surface of the dog lock and an outer surface of the dog lock groove define an annular radial gap.

2. The hose assembly of claim 1, wherein the hose includes a plastic core tube defining the inner bore of the hose end portion.

3. The hose assembly of claim 1, wherein the dog lock is crimped into the dog lock groove.

4. The hose assembly of claim 1, wherein the inner end portion of the collar is crimped against the hose end portion.

5. The hose assembly of claim 1, wherein an outer surface of the first annular flange and an inner surface of the step portion define an annular radial gap.

6. The hose assembly of claim 1, wherein the intermediate portion of the connector body further includes a third annular flange spaced apart from the second annular flange to define a tool engaging groove.

7. A hose assembly comprising:
   a hose including an end portion defining an inner bore and an outer surface;
   a connector body having an outer end portion defining a fluid connector, an inner end defining a nose portion received in the inner bore of the hose end portion, and an intermediate portion including a dog lock groove; and
   a collar including an outer end portion defining an inner radial dog lock received in the dog lock groove and an inner end portion extending radially outward of and axially inward of the dog lock, the inner end portion being in radial compression against the outer surface of the hose end portion;
   wherein the dog lock groove includes at least one tapered side surface, with the dog lock contacting the tapered side surface of the dog lock groove to provide an electrically conductive connection between the collar end the connector body; and
   wherein the dog lock has an axial width greater than an axial inner width of the dog lock groove, such that an inner surface of the dog lock and an outer surface of the dog lock groove define an annular radial gap.

8. The hose assembly of claim 7, wherein the hose includes a plastic core tube defining the inner bore of the hose end portion.

9. The hose assembly of claim 7, wherein the dog lock is crimped into the dog lock groove.

10. The hose assembly of claim 7, wherein the inner end portion of the collar is crimped against the hose end portion.

11. The hose assembly of claim 7, wherein an inner surface of the dog lock and an outer surface of the dog lock groove define an annular radial gap.

12. The hose assembly of claim 7, wherein the connector body and the collar each comprise metal.

13. The hose assembly of claim 7, wherein the intermediate portion of the connector body includes an inner axial first annular flange and an outer axial second annular flange spaced apart from the first annular flange to define the dog lock groove.

14. The hose assembly of claim 13, wherein the second annular flange defines the tapered side surface of the dog lock groove.

15. A method of making a hose assembly, the method comprising:
   providing a collar including an outer end portion defining an inner radial dog lock, an annular step portion extending radially outward of and axially inward of the dog lock, and an inner end portion extending radially outward of and axially inward from the step portion;
   inserting a hose end into the inner end portion of the collar such that an axially outer edge of an outer surface of the hose end abuts an axially inner end of the annular step portion;
   inserting a nose portion of a connector body through the outer end portion of the collar and into an inner bore in the hose end portion, such that the dog lock is axially aligned with an annular dog lock groove in an intermediate portion of the connector body; and
   crimping the collar radially inward, such that the dog lock is received in the dog lock groove, with the dog lock contacting a tapered side surface of the dog lock groove, and the hose end portion is radially compressed between the inner end portion of the collar and the nose portion of the connector body;
   wherein the dog lock has an axial width greater than an axial inner width of the dog lock groove, such that an inner surface of the dog lock and an outer surface of the dog lock groove define an annular radial gap.

16. The method of claim 15, wherein the intermediate portion of the connector body includes an inner axial first annular flange and an outer axial second annular flange spaced apart from the first annular flange to define the dog lock groove.

17. The method of claim 16, wherein inserting the nose portion of the connector body through the outer end portion of the collar and into the inner bore in the hose end portion comprises axially aligning the first annular flange with the annular step portion, such that when the collar is crimped radially inward, the outer surface of the hose end portion is secured axially inward of the first annular flange.

18. The method of claim 16, wherein the at least one of the first and second annular flanges defined a tapered side surface of the dog lock groove, wherein crimping the collar radially inward comprises crimping the dog lock into contact with the tapered side surface of the dog lock groove.

19. The method of claim 16, wherein the intermediate portion of the connector body further includes a third annular flange axially outward of and spaced apart from the second annular flange to define a tool engaging groove, the method further comprising positioning the gage tool in the tool engagement groove for abutment with the outer end portion of the collar.

20. The method of claim 15, wherein inserting the nose portion of the connector body through the outer end portion of the collar and into the inner bore in the hose end portion comprises abutting the outer end portion of the collar against a surface of a gauge tool assembled with the connector body.

* * * * *